Dec. 2, 1958  C. P. GRAHAM ET AL  2,862,739
SHAFT COUPLING DEVICE
Filed July 31, 1956
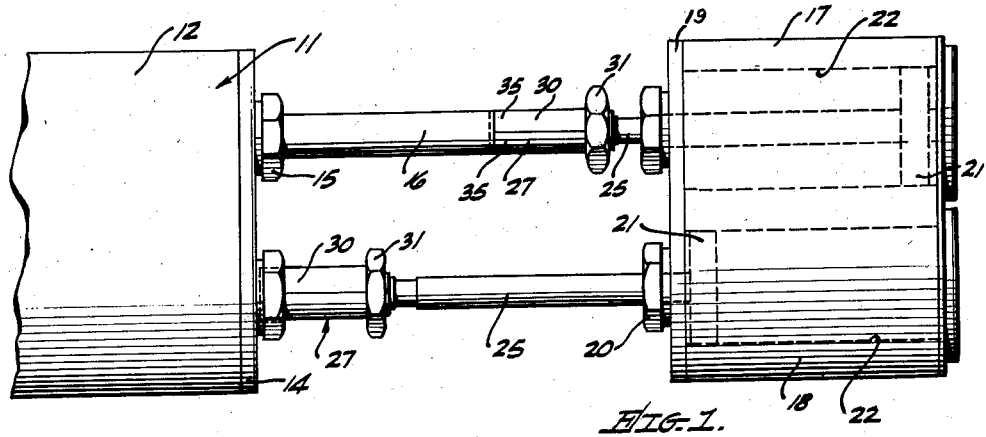
FIG. 1.
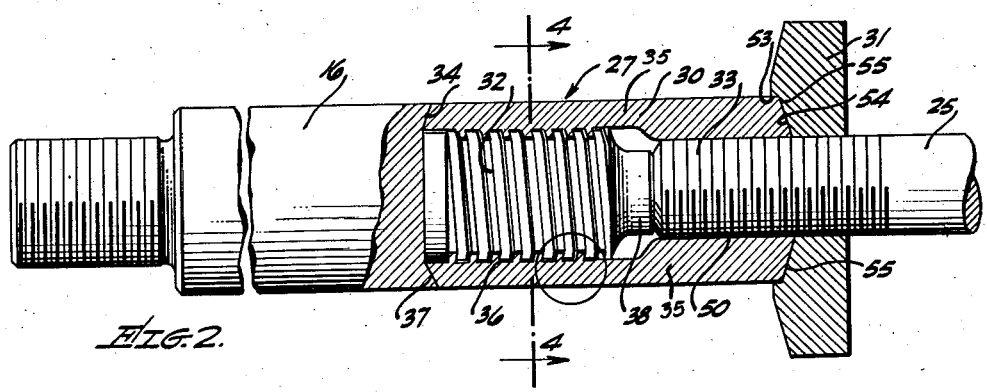
FIG. 2.
FIG. 3.
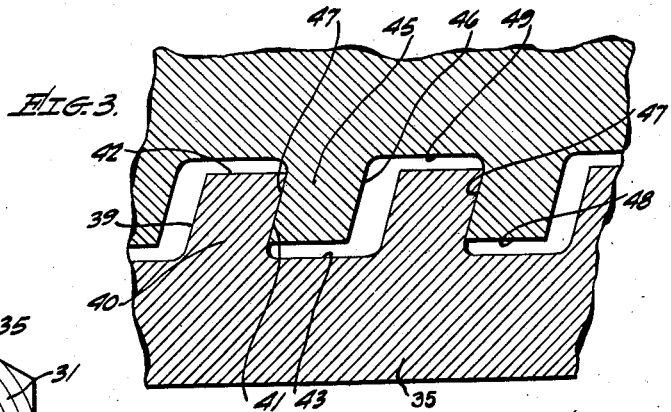
FIG. 4.
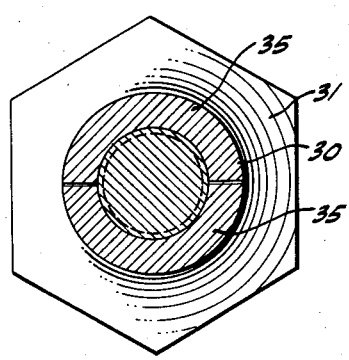
INVENTORS.
CLIFFORD P. GRAHAM,
CLARENCE H. LEATHERS,
BY William Q. Spensley
ATTORNEY.

United States Patent Office 2,862,739
Patented Dec. 2, 1958

2,862,739

SHAFT COUPLING DEVICE

Clifford P. Graham, North Hollywood, and Clarence H. Leathers, Redondo Beach, Calif., assignors to Mac-Clatchie Manufacturing Company, Compton, Calif., a corporation of California Application July 31, 1956, Serial No. 601,159

2 Claims. (Cl. 287—62)

This invention relates to an improved shaft coupling means and more particularly to an improved means for coupling adjacent ends of rods or shafts in axial alignment.

For many purposes cylindrical rods must be coupled in abutting axial alignment by coupling means which provide strength at the union while allowing ease of operation in coupling and uncoupling the rods. For example, in oil well drilling operations and similar pumping and circulating applications piston pumps of the type well known to the art must be coupled to a prime mover by coupling the piston rod of the pump to the driving rod of the prime mover. In the prior state of the art the usual means for connecting the piston rod to the driving rod in end-to-end relation for reciprocating movement consists of a threaded connection to which the end of the piston rod is externally threaded to engage an internally threaded bore in the driving rod, termed the pony rod. A particular disadvantage resulting from the use of this type of connection is the necessity for rotating the piston rod a number of times in order to couple or uncouple it from the pony rod. The piston rod is heavy and difficult to rotate, and any movement of the pump piston is difficult, particularly in mud pumps used in oil well drilling operations, due to the presence of the mud between the piston and cylinder walls. Since the piston must often be uncoupled for replacement of parts or other reasons the coupling and uncoupling of the rods is a laborious and time consuming operation.

Improved coupling means such as that disclosed and claimed in copending application Serial No. 455,384, for Pump Rod Assembly, filed September 13, 1954, by R. K. Shellman and C. H. Leathers, assigned to the assignee of the present application have achieved excellent results, however, for some purposes difficulties are encountered when ease of assembly and removal are primary considerations.

Accordingly, it is an object of the present invention to provide an improved coupling means for coupling a first rod in axial alignment with a second rod which provides ease of coupling and uncoupling not heretofore possible by means of prior art coupling devices.

It is another object of the present invention to provide a means for coupling the driving rod of a prime mover to the driven rod of a pump which requires little or no rotation of the driving or driven rod for assembly or disassembly.

It is a further object of the present invention to provide a coupling means for coupling reciprocating rods which axially aligns the rods in end-to-end relation.

It is still another object of the present invention to provide a means for coupling reciprocating rods which furnishes maximum strength at the union and is self-tightening during reciprocation of the connected rods.

The present invention comprises a split bushing and lock nut in combination with a first rod and second rod to be joined. The ends of the split bushing are radially outwardly convergent and are mateable with a tapered face of the lock nut and an undercut tapered shoulder formed on the first rod. A first longitudinal portion of the split bushing is internally threaded and mateable with the external threads of the end portion of the second rod. Radially interlocking undercut thread means are formed on the end portion of the first rod and second portion of the split bushing such that when the bushing abuts the shoulder on the first rod the split bushing is radially retained by the undercut threads.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

Fig. 1 is a partially schematic view of an illustrative prime mover and pump assembly in which two pistons are driven by means of appropriate shafting.

Fig. 2 is an enlarged sectional view of the coupling means of the present invention with the driving rod and driven rod in coupled position.

Fig. 3 is an enlarged fragmentary view of the interlocking threads of Fig. 2 in the interlocked position; and Fig. 4 is a view taken along line 4—4 of Fig. 2.

For clarity of description, the present invention will be described in its presently preferred embodiment in connection with a mud pump of the type commonly used for pumping circulating mud in oil well drilling operations. The driven rod will therefore be a piston rod of the mud pump and the driving rod will be a pony rod of the prime mover.

Referring now to the figures and particularly to Fig. 1, the prime mover 11 shown partially schematically includes a housing 12, an end plate 14, and shaft bearings 15. Extending through the shaft bearings 15 are pony rods 16 which are reciprocated by a driving means such as a crank (not shown) in the prime mover 11.

The mud pump 17 includes a housing 18, end plate 19, and shaft bearings 20. The housing encloses a pair of pistons 21 reciprocally movable within the cylinders 22. The piston rods 25 are affixed to the pistons 21 and extend through the shaft bearings 20 in axial alignment with the pony rods 16. Reciprocation of the pistons 21 in the mud pump causes circulating fluid or mud to be drawn into and forced out of the cylinders 22 under high pressure. The mud, which is often abrasive in nature, becomes entrained between the pistons and cylinder walls and makes turning or axial movement of the piston difficult for purposes of repair or replacement of parts.

The piston rod 25 is connected to the respective pony rod 16 of the prime mover 11 by the coupling means 27 constructed in accordance with the present invention. Referring particularly to Fig. 2, the coupling means 27 includes a split bushing 30 and a lock nut 31 for joining the extension 32 of the pony rod 16 to the end portion 33 of the respective piston rod 25. The end portion 33 of the piston rod 25 is externally threaded having screw threads of a conventional type. The piston rod 25 and the end portion 33 of the piston rod are of standard design and need not be altered for use in conjunction with the present invention.

The extension 32 of the pony rod has a diameter substantially less than the diameter of the pony rod and is threaded as described in detail hereinafter. At the junction of the extension 32 and the greater diameter of the pony rod an annular shoulder 34 is formed which is sloped toward the extension 32 in a radially outward direction. The end portion 38 of the extension 32 is further reduced in diameter to a diameter less than the diameter of the second internally threaded recess 50 of the split bushing as described hereinafter.

The split bushing 30 comprises two semi-cylindrical sections or split halves 35 which, when assembled, form a cylinder having an outside diameter substantially equal to the outside diameter of the pony rod in this embodiment. The semi-cylindrical sections are identical and will be described as an assembled split bushing. The ends of the cylindrical split bushing 30 are sloping and are convergently tapered radially outward of the bushing. The first end 37, that is, the end of the bushing 30 adjacent the pony rod in the assembled position of Fig. 2, is tapered at an angle substantially equal to the angle of taper of the annular shoulder 34 formed on the pony rod. The bushing 30 defines a recess 36 into which the extension 32 of the pony rod is receivable. The recess is internally threaded to mateably engage the extension of the pony rod such that the end 37 of the bushing abuts and is mateable with the annular shoulder 34. Referring particularly to Figs. 2 and 3 the threads formed externally on the extension 32 and internally in the recess 36 are radially interlocking when the bushing is assembled on the pony rod. An undercut thread is utilized which has a reverse taper on one face of the thread. Referring to Fig. 3, the leading face 39 of the female threads 40 on the internal surface of the split bushing 30, that is, the face of the thread toward the pony rod, has a direction and angle of taper which is conventional. For example, in the present embodiment the thread angles and dimensions corresponding to an Acme thread are used to define the leading face 39, the width 42 of the top of the thread, and the depth of the thread. The leading face 39 is, therefore, at a face angle and direction corresponding to that of an Acme thread of approximately 14½° from the plane perpendicular to the thread axis. The trailing face 41, however, has a reverse taper such that the leading and trailing faces of the thread are approximately parallel. The trailing face is thus an undercut face and the width of the flat 43 at the root of the thread is substantially greater than the width of the flat 42 at the top of the thread. The male thread 45 on the pony rod extension 32 is mateable with the female thread 40. The trailing face 46 of the male thread is substantially parallel to the leading face 39 of the female thread 40, and the leading face 47 of the male thread is undercut and substantially parallel to the trailing undercut face 41 of the female thread. The width of the flat 48 at the top of the thread, the depth of the thread, and the width 49 of the root of the male thread are substantially equal to those of the female thread.

Since the distance between threads is substantially greater than the width of each thread, that is, the width of the root flat 43 is greater than the width of the flat 42 at the top of the thread, a semi-cylinder of the split bushing may be placed upon the pony rod extension 32 and the threads will be engaged. If the bushing and extension are then moved longitudinally relative to each other to the position shown in Fig. 3 at which the leading face 47 of the male thread 45 abuts the trailing face 41 of the female thread 40, the undercut threads are then radially interlocked and the female thread cannot be moved radially outward from the male thread so long as relative longitudinal movement is prevented. In the present illustrative embodiment four threads per inch are used with a distance between threads of approximately 0.150 inch and a width of flat 42 at the top of the thread equal to approximately 0.100 inch. Thus, the maximum relative longitudinal movement between the bushing and pony rod extension from the radially movable position at which the trailing face 46 of the male thread abuts the leading face 41 of the female thread to the radially interlocked position, is approximately 0.050 inch. From the foregoing it may be seen that the taper of the undercut faces of the threads may be varied and is limited only by the allowed relative longitudinal movement between the threads. Thus, the horizontal amount of undercut cannot exceed the allowed relative movement.

A second internally threaded recess 50 is provided at the end of the split bushing opposed to the pony rod recess 36 to accommodate the threaded end 33 of the piston rod 25. The internal threads of the split bushing are mateable with the conventional threads on the end 33 of the piston rod. The threaded recess 50 is coextensive with the pony rod recess 36 and is threaded throughout its length.

The lock nut 31 is internally threaded and mateable with the threaded portion 33 of the piston rod. The inner face of the lock nut defines a recessed annular shoulder 53 having an inside diameter substantially equal to the outside diameter of the split bushing and a tapered wall 54 extending from the inner edge of the shoulder 53 to the inside diameter of the lock nut. The tapered end wall 54 is mateable with the tapered end face 55 of the split bushing. Thus, as the lock nut is turned to engage the assembled split bushing the annular shoulder 53 radially retains the bushing in the assembled position and the mating tapered faces 55 and 54 exert a radially inward vector on the split halves of the bushing 30.

In order to couple the illustrative pony rod 16 to the piston rod 25 by utilizing the coupling means of the present invention, the lock nut 31 is turned onto the threaded end 33 of the piston rod 25 to the right end of the threads in Fig. 2. The piston rod 25 and pony rod 16 are brought together in substantially end-to-end position with the end of the piston rod adjacent, but slightly spaced from, the end 38 of the pony rod extension 32. The split halves 35 of the bushing are then brought together around the external threads of the pony rod extension 32 and the threaded end 33 of the piston rod, with the first end 37 of the split bushing as closely adjacent the tapered shoulder 34 of the pony rod as possible. If necessary the assembled split bushing may be rotated slightly to match and engage the internal and external threads. The assembled bushing 30 is rotated to move it to the left in Fig. 2 to the position at which the end 37 of the bushing abuts the shoulder 34 of the pony rod and is radially retained thereby. A further partial turn then radially interlocks the threads of the bushing to those of the pony rod extension as described hereinbefore. The lock nut 31 is turned to the left in Fig. 2 to the position shown at which the annular shoulder 53 of the lock nut radially retains the bushing in assembled position. The piston rod is rotated a partial turn by means of the knurled section 56 to bring the end of the piston rod into firm engagement with the end 38 of the pony rod extension. Finally, the lock nut 31 is turned up tight against the end 55 of the bushing.

To uncouple the rods the lock nut is backed off to the right and the piston rod is rotated a partial turn to move it out of engagement with the pony rod. The bushing may then be rotated by hand to disengage the interlocking threads and the split halves are lifted away from the rods.

Thus, the present invention provides a means for coupling a first rod in axial alignment with a second rod with ease of coupling and uncoupling not heretofore possible by means of prior art coupling devices, since little or no rotation of the rods is necessary. In addition, the coupling means provides maximum strength at the union and is self-tightening during reciprocation of the rods.

It is to be understood that the foregoing disclosure relates to only a preferred embodiment of the invention and that numerous modifications or alterations may be made therein without departing from the spirit and scope of the invention as set forth in the claims.

What is claimed is:

1. The combination, comprising a prime mover having a pony rod and means through which the pony rod projects, said pony rod having a cylindrical surface sized for reciprocation through said means and having a reduced diameter end portion, a mud pump piston rod having an externally threaded shank axially aligned with said pony rod and abutting the end thereof, a split bushing spanning and releasably joining the end portion of said rods, first and second internally threaded longitudinal portions in said split bushing, the threads within said first portion being radially undercut, said second portion of said pony rod having external threads mateable with said internal threads of said first portion of said bushing, both ends of said bushing being tapered convergently in the radially outward direction, one of said ends being adapted to mate with said undercut shoulder of said pony rod, said bushing and end portion of said pony rod being sized to have an outside diameter substantially equal to the outside diameter of said pony rod, and a nut threadably mounted on said mud pump piston rod, said nut having a recessed tapered wall mateable with the second tapered end of said bushing.

2. The combination, comprising a prime mover having a pony rod and means through which the pony rod projects, said pony rod having a cylindrical surface sized for reciprocation through said means and having a reduced diameter end portion having a radially undercut shoulder extending axially toward said end portion, a mud pump piston rod having an externally threaded shank axially aligned with said pony rod and abutting the end thereof, a split bushing spanning and releasably joining the end portions of said rods, first and second internally threaded longitudinal portions in said split bushing, said first portion having a larger inside diameter than said second portion, the internal threads within said first portion being radially undercut, said portion of reduced diameter of said pony rod having external threads mateable with said internal threads of said first portion of said bushing, said mud pump piston rod having an outside diameter substantially equal to the inside diameter of said second portion of said bushing, both ends of said bushing being tapered convergently in the radially outward direction, one of said ends being adapted to mate with said undercut shoulder of said pony rod, said bushing and end portion of said pony rod being sized to have an outside diameter substantially equal to the outside diameter of said pony rod, and a nut threadably mounted on said mud pump piston rod, said nut having a recessed tapered wall mateable with the second tapered end of said bushing.

References Cited in the file of this patent

UNITED STATES PATENTS

| | | |
|---|---|---|
| 50,190 | Watson | Sept. 26, 1865 |
| 120,686 | Weston | Nov. 7, 1871 |
| 1,042,611 | Schulz | Oct. 29, 1912 |
| 1,806,687 | Hoover | May 26, 1931 |
| 2,377,417 | Harris | June 5, 1945 |